United States Patent [19]

Felkai et al.

[11] Patent Number: 5,028,828
[45] Date of Patent: Jul. 2, 1991

[54] DUAL DRIVE MECHANISM WITH A REDUNDANT FEATURE

[75] Inventors: Roland Felkai, Bremen; Hilmar Petrowitsch, Weyhe; Uwe Lenk, Bremen, all of Fed. Rep. of Germany

[73] Assignee: ERNO-Raumfahrttechnik GmbH, Bremen, Fed. Rep. of Germany

[21] Appl. No.: 357,312

[22] Filed: May 25, 1989

[30] Foreign Application Priority Data

May 25, 1988 [DE] Fed. Rep. of Germany ....... 3817651

[51] Int. Cl.$^5$ .................. H02K 7/10; F16H 37/06
[52] U.S. Cl. ..................................... 310/83; 74/661; 244/75 R; 310/112; 310/118
[58] Field of Search ............. 74/661; 244/175 R, 173; 310/83, 112, 114, 118, 121; 901/23, 24, 49

[56] References Cited

U.S. PATENT DOCUMENTS

| | | | |
|---|---|---|---|
| 2,427,135 | 9/1947 | Guier | 74/661 |
| 3,782,223 | 1/1974 | Watson | 74/661 |
| 4,392,393 | 7/1983 | Montgomery | 74/661 |

FOREIGN PATENT DOCUMENTS

| | | | |
|---|---|---|---|
| 2039174 | 2/1972 | Fed. Rep. of Germany . | |
| 1525571 | 9/1978 | United Kingdom | 74/661 |

*Primary Examiner*—Steven L. Stephan
*Assistant Examiner*—D. L. Rebsch
*Attorney, Agent, or Firm*—W. G. Fasse; D. H. Kane, Jr.

[57] ABSTRACT

A drive mechanism is redundantly equipped with two electric motors so that the second motor can take over the drive function if the first motor should fail, for example for moving equipment in or on a spacecraft. Both electric motors are connected to a common drive shaft. A coupling device makes sure that the defective motor is decoupled from the drive train.

4 Claims, 4 Drawing Sheets

FIG.1

DUAL DRIVE MECHANISM WITH A REDUNDANT FEATURE

FIELD OF THE INVENTION

The invention relates to a dual drive mechanism with a redundant feature, especially for driving systems in a spacecraft. Systems that can be driven by such a mechanism include, for example, pivoted outriggers, telescoping outriggers, extendable and retractable antennas, radiators, or the like, as well as locking and unlocking mechanisms. It is frequently necessary to construct the drive for such systems with redundant features to replace components that are subject to failure, for example electric motors.

BACKGROUND INFORMATION

The possible failure of an electric motor in systems of the above kind may have different effects. In some systems the failed motor may simply remain stopped without participating in the further driving. In other systems the failed motor can remain in the drive train and be driven by the auxiliary or reserve motor. Under certain circumstances, for example, when the motor winding is burned through or when the bearings have become defective, the failed motor may block the drive train. In both instances, namely when the rotor of the motor is still capable of rotating, or when the rotor is blocked, it is necessary to positively lock the failed motor by means of a brake which requires the use of a differential gear drive as part of the redundant mechanism. Such a differential gear drive is necessary because the reserve motor can drive the system, for example an outrigger to be extended, only if the failed motor is properly blocked. Such a system requires the use of sensors, magnetic brakes, and switches which in turn must be provided as redundant features and these redundant features must be properly controllable. However, the use of additional redundant features also has its disadvantages because it results in increased weight and, under certain circumstances, it may even reduce the functional reliability of the entire system.

OBJECTS OF THE INVENTION

In view of the foregoing it is the aim of the invention to achieve the following objects singly or in combination:

to construct a redundant drive mechanism strictly of mechanical means, thereby avoiding the use of additional sensors, switches, magnetic brakes, and similar components;

to make sure that the redundant drive mechanism will provide the required drive independent of the type of failure; and to keep any weight increase that is unavoidable by the provision of redundant features, to a minimum.

SUMMARY OF THE INVENTION

According to the invention there is provided a drive mechanism with two electric drive motors which are arranged in such a manner that the motor which is still operable will remain able to drive the respective system, for example, a satellite outrigger. As long as the rotor of the first motor is still able to rotate, the other motor will rotate the rotor of the failed motor. However, if the rotor of the failed motor should be blocked, for example, due to a bearing failure or because its winding is burned or expanded for whatever reasons, then a mechanical coupling system makes sure that the defective motor is decoupled from the drive train.

BRIEF DESCRIPTION OF THE DRAWINGS

In order that the invention may be clearly understood, it will be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
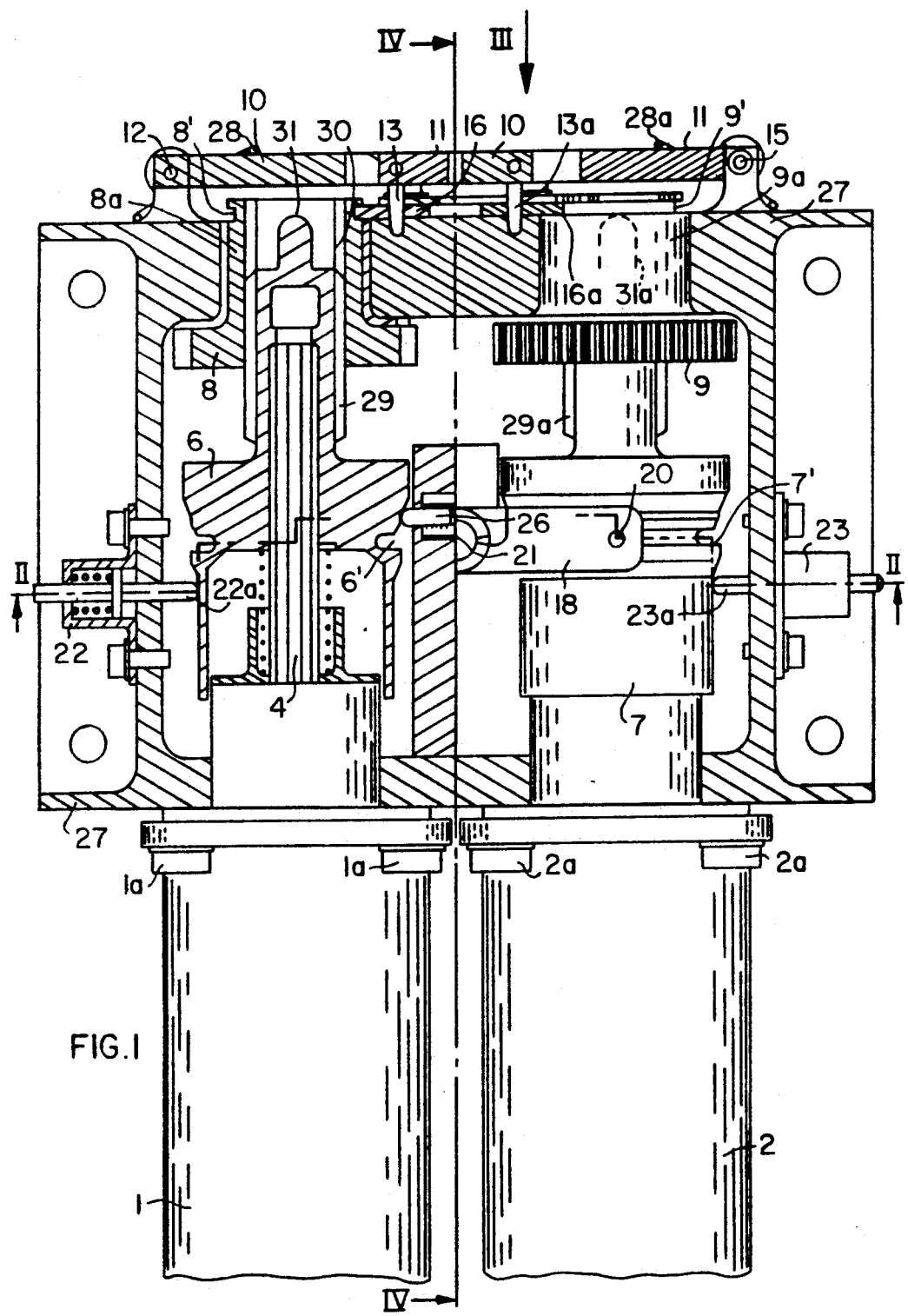
FIG. 1 is a side view, partially in section along section plane I—I in FIGS. 2 and 3, of a drive mechanism according to the invention, comprising two electric motors.
Figure 2:
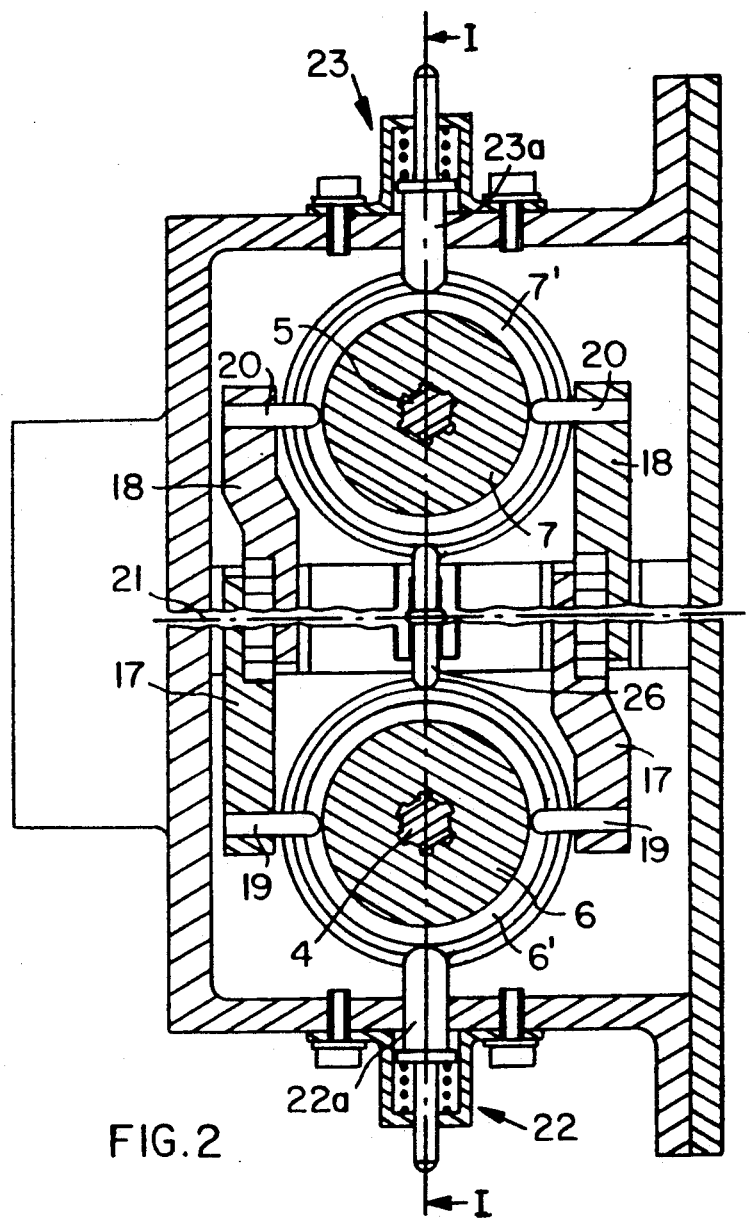
FIG. 2 is a sectional view along section line II—II in FIG. 1.
Figure 4:
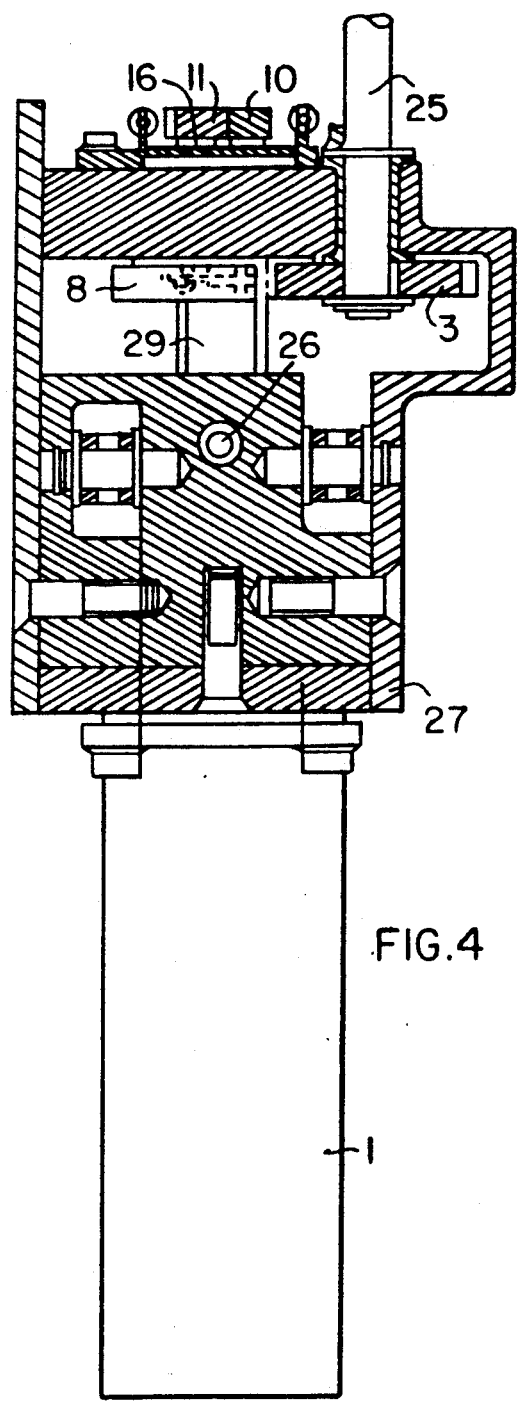
FIG. 4 is a partially sectioned view along section line IV—IV in FIG. 1.

The present drive mechanism comprises two electromotors 1 and 2 best seen in FIG. 1. The motors 1 and 2 are secured with the motor housings to a gear and clutch housing 27 by means of screws 1a and 2a. Each motor has its own multi-spline drive shaft. Thus, the motor 1 has a multi-spline drive shaft 4 and the motor 2 has a multi-spline drive shaft 5 shown in FIG. 2. Each multi-spline drive shaft 4,5 cooperates with an axially movable coupling control sleeve 6 or 7 respectively, as best seen in FIG. 2. The movable sleeves 6 and 7 are each screwed into a respective drive gear wheel 8 and 9 which mesh with a driven gear wheel 3 rigidly mounted on a driven shaft 25 as best seen in FIG. 4. The shaft 25 extends out of housing 27 and is the output shaft. Each drive gear wheel 8, 9 has a bushing 8a, 9a rigidly attached to the respective drive gear wheel 8, 9. The bushing 8a has an inner threading 30 meshing with an outer threading 29 on the control sleeve 6. The bushing 9a has an inner threading which meshes with the outer threading 29a on the respective control sleeve 7.

Figure 3:
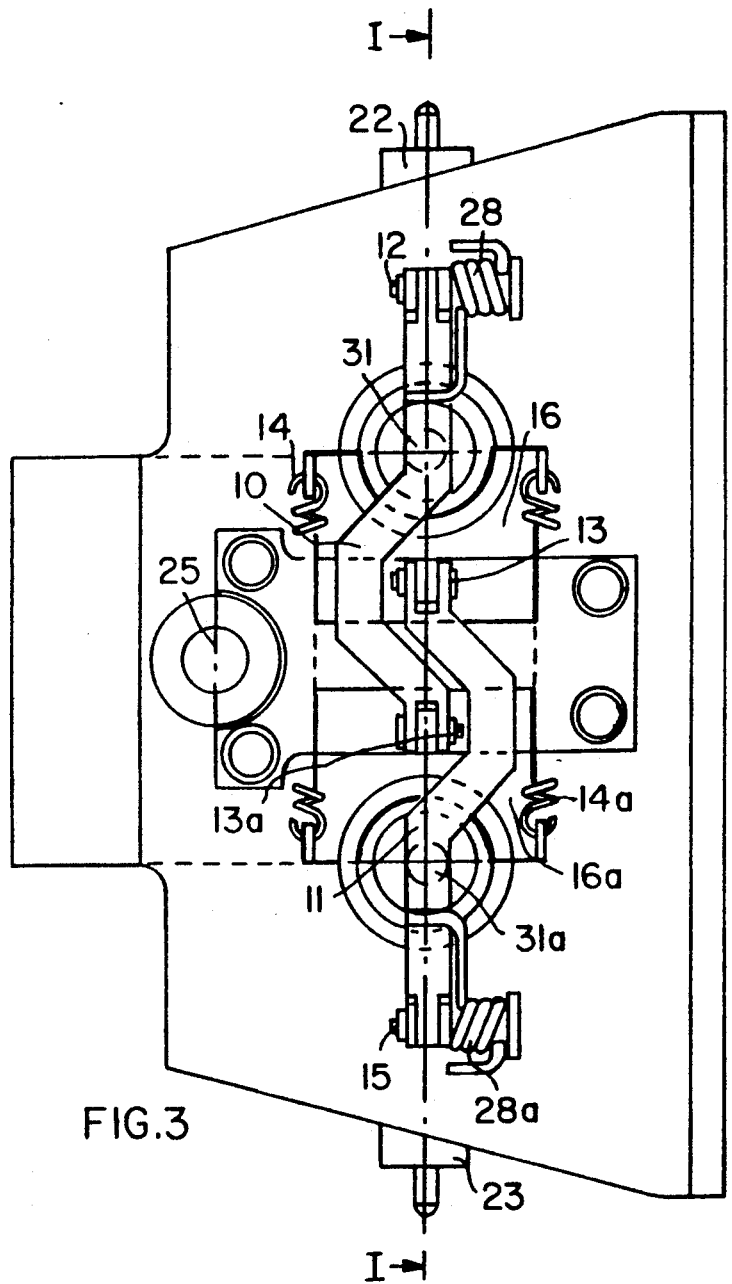
FIG. 3 is a view in the direction of the arrow III in FIG. 1.

Assuming that the electric motor 2 has become defective so that its rotor is blocked, in that case the three gear wheels 3, 8 and 9 become stationary for a short moment. Only after a defined mechanical resistance, such as the friction force in the threaded connection 29, 29a between the, movable sleeve 6, 7 and the respective drive gear 8,9, will the has been overcome axially movable sleeve 6 on the drive shaft 4 of the still functioning motor 1, screw itself with its outer threading 29 into the inner threading 30 of the bushing 8a of the driving gear wheel 8. Thus, a tip 31 of the movable sleeve 6 is moved in the direction toward a gear wheel locking and unlocking lever 10 for tilting this lever 10 counterclockwise about a pivot axis 12 seen in FIG. 3. Springs 28, 28a seen in FIG. 3 normally bias the locking ring and unlocking levers 10,11 into the locking position in which a locking disk 16, 16a engages a ring groove 8', 9' in the bushings 8a, 9a for locking the respective gears 8, 9 against axial movement. The lever 10,11 and the biasing spring 28, 28a are best seen in FIG. 3. As the tip 31 of the sleeve 6 tilts the lever 10 against the biasing force of the spring 28, a pin 13a secured to the free end of the lever 10 is lifted out of a hole in a locking disk 16a, thereby releasing the locking disk 16a which is biased by means of springs 14,14a into a disengaging position. As a result, the locking disk 16a follows the action of the springs 14, 14a which pull an edge of the locking disk 16a out of the groove 9' in the bushing 9a of the drive gear 9, whereby the blocked drive gear 9 is released out of the drive train.

As the still operational motor 1 continues to rotate its drive shaft 4, the slideable control sleeve 6 continues to screw itself into the drive gear 8 and its bushing 8a, whereby the locking and unlocking lever 10 for the respective gear wheel is opened still further. This sliding motion of the sleeve 6 into the gear wheel 8 and its bushing 8a entrains a tilting lever pair 17 shown in FIG. of a set of double tilting levers 17 and 18, by means entraining pins 19 which engage a groove 6', of the control sleeve 6. These levers 17 are tilted about a journal axis 21 best seen in FIG. 2 and the tilting motion of the lever pair 17 takes place during the entire duration of the screw-in operation of the slideable control sleeve 6 into the gear drive wheel 8 and its bushing 8a.

The set of double levers 17, 18 is so constructed that each of these double levers can be tilted about the common journal axis 21 without initially entraining the respective other double lever in the tilting operation until one of the two gear wheel locking and unlocking levers 10, 11 has been opened to such an extent that the arresting of the respective drive gear wheel 8 or 9 in the axial direction is released. In the assumed example the rotor of the electromotor 2 has become blocked, the drive gear wheel 9, together with its axially movable sleeve 7, will be released out of the drive train by the pull-out of the locking disk 16a as described above. After the release, the motor 1 which is still functional, screws the movable sleeve 6 still further into the drive gear wheel 8, whereby the double lever 17 contacts the double lever 18 to thereby entrain the double lever 18 in the tilting operation. As a result of this entrainment, the pins 20 attached to the free ends of the double levers 18 and engaging a groove 7' in the sleeve 7 as best seen in FIG. 2, withdraw the driving gear wheel 9 with its movable sleeve 7 out of the common drive train. Therefore, the meshing gear of the teeth of the driving gear 9 with the gear teeth of the driven gear wheel 3 is interrupted. This newly established operational condition is now arrested by means of a spring biased pin 23a of a locking unit 23. For this purpose, the pin 23a engages a ring groove 7' in the movable sleeve 7. Thus, the driving gear wheel 9 of the blocked defective motor 2 is now withdrawn from the drive train. Therefore, and since the motor 1 is still operational, the movable sleeve 6 is screwed still further into the driving gear wheel 8 so that the motor 1 is enabled to again drive the driven gear wheel 3. An arresting pin 26 arrests the movable sleeve 6 in its maximally extended position in which the pin 26 engages the groove 6' in the sleeve 6 thereby preventing any disengagement of the motor 1 from the drive train.

The redundant driving mechanism according to the invention is constructed completely symmetrical in such a way that either one or the other motor can be decoupled from the drive train. Thus, the defective motor is removed by the present mechanism from the drive train while maintaining the desired driving direction, for example, during the extending of an outrigger. The extension continues with but a brief interruption, and pulling back of an outrigger that is supposed to be extended, is avoided.

When a defective motor is blocked in the opposite rotational direction, for example, during the pulling-in of an outrigger, it is necessary to stop the drive mechanism and to permit it to run in the original direction, namely in the extension direction for a short period of time until the decoupling of the defective motor is accomplished. Thereafter, the drive mechanism can be caused to run in the desired direction by changing the motor drive direction.

The present drive mechanism is also equipped to handle situations in which the driven system temporarily applies an excess load to the drive mechanism, for example, when an outrigger that is being pulled in or extended, is temporarily jammed. In such a situation both motors remain fully operational without taking each other out of the drive train. The system is further so constructed that it is impossible to block both motors simultaneously, or rather, take both motors out of the drive train simultaneously. In order to avoid such situations, the driven shaft 25 is equipped with, a friction clutch having a limit torque moment that is distinctly smaller than the torque moment to be transmitted between the movable sleeves 6 and 7 and the respective drive gear wheels 8 and 9.

The redundant drive mechanism of the invention is constructed and arranged to operate as follows. The two electromotors 1 and 2 are arranged in parallel to each other and connected to a gear drive and coupling housing 27. The motors operate a common driven output shaft 25 through a mechanical clutch or coupling and through a gear drive. The mechanical coupling disengage one of the motors automatically in response to a blocking or arresting of the rotor of said one motor. The coupling means and the gear drive for both electrical motors are constructed symmetrically and redundantly. Thus, two driving sets of the just mentioned elements are provided. Each of the two motors 1, 2 is equipped with a multiple spline driving shaft 4, 5. A movable coupling control sleeve 6, 7 is mounted on each of the motor drive shafts. The movable coupling control sleeves comprise an outer threading engaging an inner threading of the respective drive gear wheel 8, 9 for threading the coupling control sleeves into the respective drive gear wheel. The drive gear wheels mesh with a driven gear wheel 3 mounted on the driven output shaft 25. The driven output shaft extends out of the gear and coupling housing 27 on an output side opposite of said electric motors connected to an input side of the housing 27. A gear wheel arresting and releasing lever 10, 11 is arranged on the output side of the housing for each driving set. Each gear wheel arresting and releasing lever is equipped with its respective biasing spring 28, 28a for tilting about a respective axis 12, 15, the gear wheel arresting and releasing levers 10, 11 are tiltable by means of tips 31, 31a forming part of the movable coupling control sleeves 6,7, whereby the tip 31, 31a of that movable sleeve passes through a respective hole in the output housing wall, the motor of which is not blocked or arrested. Before the tip 31, 31a can move through its hole, a defined mechanical resistance must have been overcome, for example a frictional force such as that caused by the threaded engagement between the outer thread of the coupling sleeve and the inner thread of the respective gear wheel. The arresting and releasing levers 10, 11 of the locking disk 16, 16a have at their ends respectively a pin 13, 13a which fixes or arrests the respective spring biased locking disk 16, 16a when the respective lever 10, 11 is in its non tilted-out condition, that is, in its tilted-in condition. The locking disks 16, 16a lock the driving gear wheels against movement in an axial direction. A double lever 17, 18 is mounted in the housing in the center of the gear drive and coupling sets, said double levers 17, 18 being pivoted by means of pins to the respective movable coupling control) sleeves, whereby the double levers are connected through these movable sleeves with the respective drive gear wheels 8, 9. The double levers 17, 18 are independent of each other within a defined angular range, whereupon they are movable in common after reaching a stop, when the locking disk 16, 16a of the blocked driving set is released or opened. The double lever of the blocked set, including its movable coupling control sleeve and the gear wheel on the sleeve, are pulled out of the drive train toward the side to which the electric motor is attached to the housing, whereby simultaneously the movable sleeve of the still active driving set is further screwed into the respective driving gear wheel until a spring biased pin 22a, 23a of a locking or arresting unit 22, 23 fixes the movable sleeve in its maximal withdrawn position.

A return movement locking pin 26 fixes the respective movable sleeve 6, 7 in its maximum moved-out position when it is screwed deep into the respective gear wheel 8, 9 of that part of the drive system which is still active. The driven shaft 25 is equipped with a friction clutch having a limit torque moment smaller than the torque moment to be transmitted between the movable sleeve and the respective driving gear wheel.

Although the invention has been described with reference to specific example embodiments, it will be appreciated that it is intended to cover all modifications and equivalents within the scope of the appended claims.

What we claim is:

1. A drive mechanism with a redundant feature, comprising:
   (a) a housing (27), gear means including two driving gears (8, 9) mounted for rotation in said housing (27), coupling means mounted in said housing for cooperation with said gear means, two electric drive motors (1, 2) secured in parallel to each other to one side of said housing (27), each electric motor (1, 2) having a multi-spline drive shaft (4, 5);
   (b) each multi-spline shaft reaching into said housing for cooperation with its respective coupling means for connecting and disconnecting each of said electric motors with its respective gear means, said coupling means comprising two coupling control sleeves (6, 7), one control sleeve being mounted for an axial displacement on each of said multi-spline drive shafts (4, 5);
   (c) each coupling control sleeve (6, 7) having an outer threading (29, 29a), each of said driving gears (8, 9) having an inner threading (30, 30a) for threadingly engaging said outer threading (29, 29a) of the respective coupling control sleeve (6, 7) for controlling an engaging and a disengaging of said gear means with a drive train;
   (d) said drive mechanism further comprising a driven output shaft (25) extending out of said housing (27), said gear means further including a driven gear (3) on said output shaft (25) arranged for meshing with said two driving gears (8, 9) to drive said output shaft (25);
   (e) said coupling means comprising gear arresting and releasing lever means (10, 11), each lever means (10, 11) including a free end and an arresting element (13, 13a) at its free end, journal members (12, 15) for tiltably mounting said gear arresting and releasing lever means (10, 11) to another side of said housing (27) opposite said first mentioned side of said housing, and spring means (28, 28a) for normally holding each gear arresting and releasing lever means (10, 11) into a gear engaging position;
   (f) each of said coupling control sleeves having a pushing tip (31, 31a) for pushing a respective one of said gear arresting and releasing lever means (10, 11) into a gear releasing position in response to a threading movement between said outer and inner threadings (29, 29a, 30, 30a), whereby one of said movable coupling control sleeves (6, 7), whose electric motor (1, 2) is still operational, pushes its tip (31, 31a) through a hole in said housing (27) for operating the respective one of said gear arresting and releasing lever means (10, 11);
   (g) said drive mechanism further comprising locking disks (16, 16a) for normally locking said driving gears (8, 9) against an axial movement, biasing spring means (14, 14a) for normally urging said locking disks (16, 16a) out of a gear engaging position, said arresting elements (13, 13a) each fixing a respective one of said locking disks (16, 16a) in said gear engaging position against a biasing force of said biasing spring means (14, 14a);
   (h) said coupling means further comprising at least one coupling lever having two arms (17, 18) journalled (at 21) in said housing (27) for interconnecting said coupling control sleeves (6, 7), said lever arms (17, 18) having pins (19, 20) for engaging a respective one of said coupling control sleeves (6, 7), whereby said coupling lever with its two arms (17, 18) is connected to said gear means (8, 9) for axially displacing a respective gear means out of a drive train when the respective locking disk (16, 16a) is released from the respective gear means (8, 9);
   (i) said two arms (17, 18) of said coupling lever being tiltable independently of each other within a certain angular tilting range until a stop is reached, whereupon said two arms (17, 18) are tiltable in unison; and
   (j) wherein said coupling control sleeve (6, 7) of a still operational motor is screwed still further into its respective gear (8, 9) when said locking disk (16, 16a) of a blocked drive side is unlocked, whereby said coupling lever (17, 18) of said blocked drive side including its coupling control sleeve (6, 7) and gear means (8, 9) are pulled out of the drive train toward the respective electric drive motor (1, 2) until a spring biased pin (22a, 23a) of an arresting unit (22, 23) fixes the respective coupling control sleeve (6, 7) in its maximal retracted position.

2. The drive mechanism of claim 1, further comprising a return movement locking pin (26) for fixing a respective one of said movable coupling control sleeves (6, 7) in its maximum moved-out position when it is screwed deep into its respective gear means (8, 9) of that part of said drive mechanism which is still operational.

3. The drive mechanism of claim 1, wherein said gear arresting and release lever means (10, 11) comprises two levers arranged in a laterally overlapping relationship, so that said pushing tip (31, 31a) of one coupling control sleeve (6, 7) can release said locking disk (16, 16a) of the respective other driving gear and vice versa.

4. The drive mechanism of claim 1, wherein said arresting elements (13, 13a) are pins which normally engage a hole in the respective locking disk (16, 16a), and wherein said pins are lifted out of the respective locking disk by the tilting movement of the respective lever means (10, 11).

* * * * *